US011588712B2

(12) United States Patent
Nijhawan et al.

(10) Patent No.: US 11,588,712 B2
(45) Date of Patent: Feb. 21, 2023

(54) SYSTEMS INCLUDING INTERFACES FOR COMMUNICATION OF RUN-TIME CONFIGURATION INFORMATION

(71) Applicant: Nutanix, Inc., San Jose, CA (US)

(72) Inventors: Aman Nijhawan, Seattle, WA (US); Anil Kumar Kushwah, Bangalore (IN); Jie Li, San Jose, CA (US); Vinod Gupta, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 298 days.

(21) Appl. No.: 16/206,237

(22) Filed: Nov. 30, 2018

(65) Prior Publication Data

US 2020/0177474 A1 Jun. 4, 2020

(51) Int. Cl.
*H04L 41/5054* (2022.01)
*H04L 41/5041* (2022.01)
*H04L 41/0803* (2022.01)
*G06F 9/455* (2018.01)
*G06F 9/50* (2006.01)
*H04L 12/46* (2006.01)
(Continued)

(52) U.S. Cl.
CPC ...... *H04L 41/5054* (2013.01); *G06F 9/45558* (2013.01); *G06F 9/5011* (2013.01); *G06F 9/5072* (2013.01); *G06F 9/5077* (2013.01); *H04L 12/4633* (2013.01); *H04L 12/66* (2013.01); *H04L 41/0803* (2013.01); *H04L 41/5048* (2013.01); *G06F 2009/45583* (2013.01); *G06F 2209/5011* (2013.01); *H04L 61/4511* (2022.05)

(58) Field of Classification Search
CPC . H04L 41/5054; H04L 12/4633; H04L 12/66; H04L 41/0803; H04L 41/5048; H04L 61/1511; G06F 9/45558; G06F 9/5011; G06F 9/5072; G06F 9/5077; G06F 2209/5011; G06F 2009/45583
See application file for complete search history.

(56) References Cited

U.S. PATENT DOCUMENTS 8,549,518 B1 10/2013 Aron et al.
8,601,473 B1 12/2013 Aron et al.
(Continued)

OTHER PUBLICATIONS

Jack Webb, Network Demilitarized Zone (DMZ), Aug. 2016, ICTN 6870 (Year: 2016).*
(Continued)

*Primary Examiner* — John A Follansbee
*Assistant Examiner* — Fadi Haj Said
(74) *Attorney, Agent, or Firm* — Stoel Rives LLP

(57) ABSTRACT

Examples of services described herein expose an application programming interface (API) which may return the run-time configuration information. In this manner, software external to the service (e.g., an orchestrator) may query the service to determine the run-time configuration information, then provide both the initial configuration information known to the external software and the run-time configuration information to an Internet-facing gateway. Examples described herein may accordingly avoid or reduce instances of an upgrade dependency. When the service is upgraded, the run-time configuration information may be obtained by calling the API without a need to also upgrade the software external to the service.

29 Claims, 4 Drawing Sheets

(51) Int. Cl.
  *H04L 12/66* (2006.01)
  *H04L 61/4511* (2022.01)

(56) References Cited

U.S. PATENT DOCUMENTS

| | | | |
|---|---|---|---|
| 8,849,941 | B2 | 9/2014 | Alladi et al. |
| 8,850,130 | B1 | 9/2014 | Aron et al. |
| 9,465,622 | B2 | 10/2016 | Jagatheesan et al. |
| 9,772,833 | B2 | 9/2017 | Low et al. |
| 9,772,866 | B1 | 9/2017 | Aron et al. |
| 9,973,511 | B2 | 5/2018 | Ott et al. |
| 10,013,269 | B2 | 7/2018 | Moeller et al. |
| 10,474,559 | B2 | 11/2019 | Moorthi et al. |
| 10,498,611 | B1 * | 12/2019 | Kloberdans ......... H04L 41/5054 |
| 2002/0184536 | A1 | 12/2002 | Flavin |
| 2009/0199175 | A1 | 8/2009 | Keller et al. |
| 2014/0059226 | A1 * | 2/2014 | Messerli ............... H04L 47/783 |
| | | | 709/226 |
| 2017/0279767 | A1 | 9/2017 | Fork et al. |
| 2018/0359311 | A1 | 12/2018 | Paramasivam |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Cano, Ignacio et al. "Curator: Self-Managing Storage for Enterprise Clusters"; University of Washington; published Mar. 2017; pp. all.

* cited by examiner

SYSTEMS INCLUDING INTERFACES FOR COMMUNICATION OF RUN-TIME CONFIGURATION INFORMATION

TECHNICAL FIELD

Examples described herein generally relate to computing systems, including cloud computing systems. Examples of data center systems using interfaces for communication of run-time configuration information are described.

BACKGROUND

Cloud computing generally refers to scalable and flexible architectures for providing information technology (IT) resources as a service to one or more customers. Often, data centers are used to house servers and other hardware which may host software services, store data, or both, for any number of customers. The demands of robustly setting up, maintaining, and securing data centers or other cloud computing platforms are increasingly complex.

To aid in scalability and flexibility, cloud computing platforms often employ virtualization, which may aid in decoupling the physical hardware resources from the software services to be hosted in the cloud—allowing for flexible assignment of particular software computing or storage loads to hardware in the cloud. A virtual machine (VM) generally refers to a software-based implementation of a machine in a virtualization environment, in which the hardware resources of a physical computer (e.g., CPU, memory, etc.) are virtualized or transformed into the underlying support for the fully functional virtual machine that can run its own operating system and applications on the underlying physical resources just like a real computer.

Virtualization generally works by inserting a thin layer of software directly on the computer hardware or on a host operating system. This layer of software contains a virtual machine monitor or "hypervisor" that allocates hardware resources dynamically and transparently. Multiple operating systems may run concurrently on a single physical computer and share hardware resources with each other. By encapsulating an entire machine, including CPU, memory, operating system, and network devices, a virtual machine may be completely compatible with most standard operating systems, applications, and device drivers. Most modern implementations allow several operating systems and applications to safely run at the same time on a single computer, with each having access to the resources it needs when it needs them.

Establishing, maintaining, and upgrading virtualized systems in a cloud environment is increasingly complex. The demand for continuous availability of services, upgraded software, and the need to service multiple tenants in a cloud environment can place significant demands on system operators.

DETAILED DESCRIPTION

Figure 1:
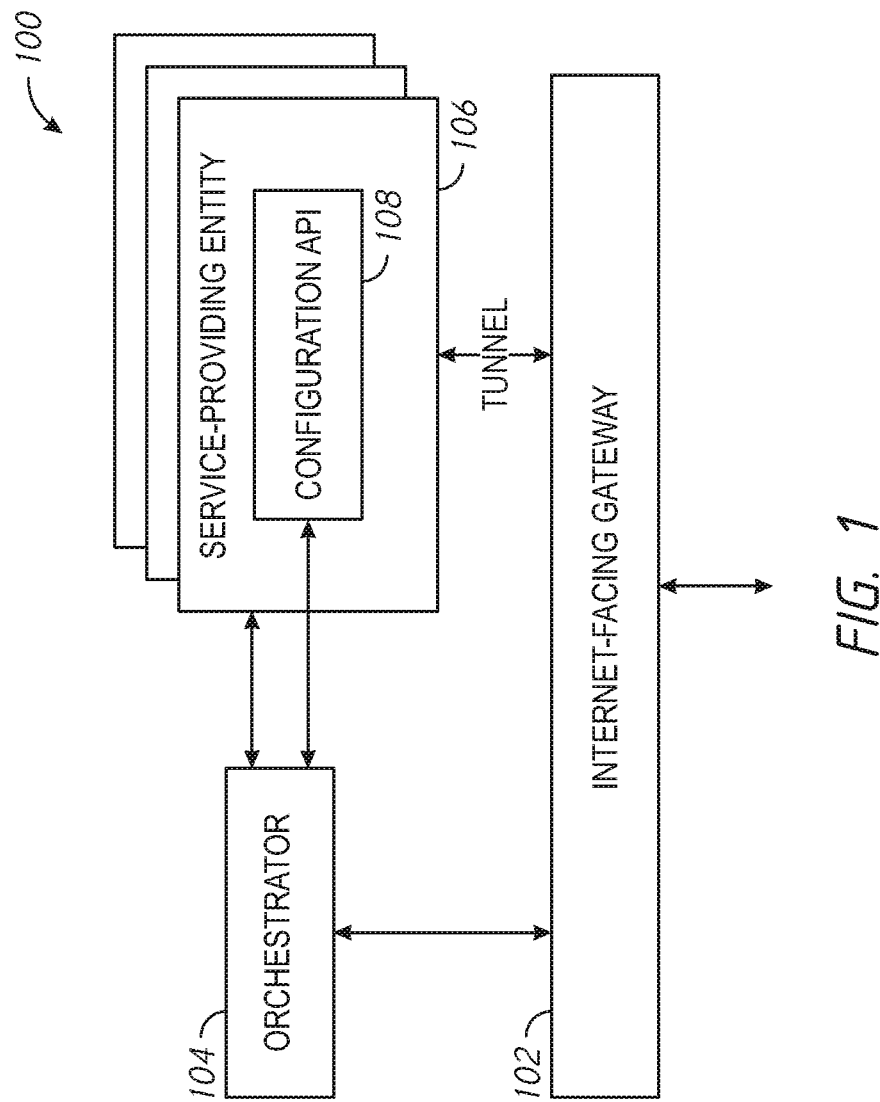
FIG. 1 is a schematic illustration of a system arranged in accordance with examples described herein.

Certain details are set forth herein to provide an understanding of described embodiments of technology. However, other examples may be practiced without various of these particular details. In some instances, well-known computer system components, data center components, circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Cloud computing systems may utilize an Internet-facing gateway to facilitate connection between external users and services hosted by the cloud computing system. In order to provide such a connection in a secure manner, the Internet-facing gateway should be provided with accurate configuration information about the services provided by the cloud computing system. There may generally be at least two kinds of configuration information—configuration information determined externally to the service (e.g., before the service is running), and configuration information determined when the service is launched and/or upgraded (e.g., run-time configuration information). A cloud computing system may include an orchestrator which may launch and/or upgrade or otherwise maintain services hosted by the cloud computing system. The orchestrator may be in a trusted network with the Internet-facing gateway and may be able to communicate configuration information to the Internet-facing gateway. However, an upgrade dependency may be created between the orchestrator and the service-providing entities maintained by the orchestrator. For example, if an upgrade of the service-providing entity generates new or changed run-time configuration information, it may also be necessary to upgrade the orchestrator to provide the orchestrator with the updated run-time configuration information. It may be time consuming or cumbersome to require upgrading of the orchestrator together with upgrade of service-providing entities maintained by the orchestrator. Such a requirement may cause unnecessarily frequent upgrades of the orchestrator, which may service many service-providing entities.

Examples of services described herein expose an application programming interface (API) which may return the run-time configuration information responsive to a query by the orchestrator. In this manner, software external to the service (e.g., an orchestrator) may query the service to determine the run-time configuration information, then provide both the initial configuration information known to the external software and the run-time configuration information to the Internet-facing gateway. Examples described herein may accordingly avoid or reduce instances of an upgrade dependency between orchestrators and service-providing entities. When the service-providing entity is upgraded, the new and/or changed run-time configuration information for the service-providing entity may be obtained by an orchestrator calling the API without a need to also upgrade the software external to the service the orchestrator).

FIG. 1 is a schematic illustration of a system arranged in accordance with examples described herein. The system 100 includes an Internet-facing gateway 102, orchestrator 104, service-providing entity 106, and configuration API 108.

The system 100 may include any number of service-providing entities, such as service-providing entity 106. The service-providing entities, including service-providing entity 106 may be hosted, for example, in one or more clusters in a data center. The orchestrator 104 may be in communication with the service-providing entities, such as service-providing entity 106. The orchestrator 104 may, in operation, create, destroy, upgrade, administer, maintain, and/or perform other actions with respect to service-providing entities. The orchestrator 104 may be in communication with the Internet-facing gateway 102. The orchestrator 104 may create, destroy, upgrade, administer, maintain, and/or perform other actions with respect to a communication path between the service-providing entity 106 and the Internet-facing gateway 102. All or portions of the system 100 may be provided at a data center. The system 100 of FIG. 1 is shown by way of example; additional, fewer, and/or different components may be used in other examples.

Examples of systems described herein may include one or more service-providing entities, such as service-providing entity 106 of FIG. 1. Generally, a service-providing entity refers to a portion of a computing system (e.g., a portion of a virtualized system) which may provide one or more software services. Examples of service-providing entities include clusters, management planes, nodes, and virtual machines. Any variety of software services may be provided by service-providing entities described herein, including, for example, management of I/O requests between the service-providing entity and a shared storage pool, cluster administration, or generally any function that may be provided by a virtual machine, including a user virtual machine.

Service-providing entities described herein clusters, virtual machines) may expose a configuration application programming interface (API), such as the configuration API 108 of FIG. 1. Each service-providing entity may expose a configuration API. The configuration API may be configured to provide run-time confirmation information. Run-time configuration information may generally refer to configuration information generated at a time the service-providing entity is setup, upgraded, at a time of another change to the service-providing entity, or combinations thereof. The configuration API may accordingly be a software interface to a service-providing entity which may respond to a query (e.g., a request for run-time configuration information) with the run-time configuration information. The am-time configuration information may be provided in a variety of formats, for example as a json template.

Systems described herein may include orchestrators, such as the orchestrator 104 of FIG. 1. Generally, an orchestrator refers to a software component which may have responsibility for (e.g., may administer) all or a portion of the life cycle of one or more service-providing entities. For example, the orchestrator 104 may create, destroy, upgrade, maintain, and/or perform other actions with respect to service-providing entity 106 of FIG. 1. The orchestrator 104 may be implemented using, for example, a data center manager. The orchestrator 104 may be implemented on physical hardware which may comingled and/or distinct with the physical hardware used to implement the service-providing entit(ies) it interacts with. The orchestrator 104 may be co-located at a data center with one or more service-providing entit(ies) and/or may be located remotely from the data center and in communication with the service-providing entit(ies). The orchestrator 104 may be multi-tenant. Multi-tenant generally refers to the ability of the orchestrator 104 to communicate with service-providing entities, such as clusters and/or virtual machines, associated with multiple customers of a data center. In contrast, service-providing entities, such as service-providing entity 106, may be associated with a single tenant of the data center. At least in part because an orchestrator has responsibility for all or portions of the life cycle of service-providing entities, the orchestrator has access to some configuration information about the service-providing entities it manages. Such configuration information may be provided to the orchestrator, for example, by another entity that has requested the creation and/or upgrade of a service-providing entity. Such configuration information may be generated by the orchestrator and/or stored and/or accessed by the orchestrator. While a single orchestrator 104 is shown in FIG. 1, example systems may include any number of orchestrators. Each orchestrator may be in communication with any number of service-providing entities. Multiple orchestrators in a system may communicate using a trusted network with each other and with one or more Internet-facing gateways in the system, such as Internet-facing gateway 102. In contrast, service-providing entities in the system 100, such as service-providing entity 106 may not be on the trusted network, and may themselves be unable to communicate directly and/or authoritatively with the Internet-facing gateway 102.

Systems described herein may be used to generate, store, and/or communicate configuration information. Configuration information generally refers to information which may be specific to an entity (e.g., a cluster, virtual machine, etc.) and which may describe the entity such that an Internet-facing gateway can communicate with (e.g., transfer data to and/or from) the service-providing entity. Examples of configuration information include an internal uniform resource locator (URL) of the entity, an external URL of the entity, one or more parameters associated with the entity, a secure socket layer (SSL) connection to the entity, authentication parameters for the entity, a location of a certificate associated with the entity, software packages used by the entity, version numbers of software used by the entity, an amount of storage allocated to the entity, an amount of computing resources allocated to the entity, IP address(es) of the entity, domain name(s), and combinations thereof. Two general types of configuration information may be relevant to examples of systems and methods described herein. One type of configuration information may be configuration information that is generated by and/or stored in a location accessible to an orchestrator, such as the orchestrator 104 of FIG. 1. That type of configuration information may be said to be "known" by the orchestrator. Examples of configuration information which may be known by the orchestrator may include a version of software used to create the entity, an amount of storage and/or compute resources allocated to the entity. Another type of configuration information may be run-time configuration information. The run-time configuration information may refer to configuration information which is not generated and/or stored until an entity is created and/or upgraded. The run-time configuration information may be generated by the service-providing entity itself, and/or using the service-providing entity in some examples. Examples of run-time configuration information may include a domain name of the entity, an IP address of the entity, an SSL connection to the entity, and combinations thereof. In some examples, run-time configuration information includes information used in providing a DNS mapping for the service.

Examples of systems described herein may include one or more Internet-facing gateways, such as the Internet-facing gateway 102 of FIG. 1. An Internet-facing gateway may generally facilitate communication between users of an external network (e.g., an Internet) and the service-providing entities. The Internet-facing gateway uses configuration information for the service-providing entity to facilitate the communication between users of the external network and the service-providing entity. Accordingly, examples described herein may aid in ensuring that the Internet-facing gateway is supplied with accurate and up-to-date configuration information about service-providing entities in communication with the Internet-facing gateway, including both configuration information known to the orchestrator and run-time configuration information. The Internet-facing gateway 102 may be able to communicate with the orchestrator 104 and/or other orchestrators in the system 100. While a single Internet-facing gateway 102 is shown in FIG. 1, any number of Internet-facing gateways may be used in some examples. The Internet-facing gateway 102 may be able to communicate directly and/or authoritatively on a trusted network (e.g., a network of orchestrators, including orchestrator 104). However, the Internet-facing gateway 102 may be unable to communicate directly and/or authoritatively with service-providing entities which may not be on the trusted network, such as service-providing entity 106. Accordingly, while the Internet-facing gateway 102 may obtain configuration information known to the orchestrator 104 from orchestrator 104, it may not be able in some examples to obtain run-time configuration information directly from the service-providing entity 106.

Configuration APIs described herein, such as configuration API 108 may facilitate the collection of configuration information to be provided to an Internet-facing gateway. For example, the orchestrator 104 may query the configuration API 108 to receive the current run-time configuration information. Then, the orchestrator 104 may provide both configuration information already known to the orchestrator 104 and the run-time configuration information obtained through the configuration API 108 to the Internet-facing gateway 102. For example, the orchestrator 104 may call the Internet-facing gateway 102 with an extended payload including the run-time configuration information.

Having the configuration information may then allow the Internet-facing gateway 102 to allow connections to the service-providing entity 106 from an Internet through the Interpret-facing gateway 102. For example, the orchestrator 104 and Internet-facing gateway 102 may create a tunnel between the Internet-facing gateway 102 and service-providing entity 106. Generally, a tunnel may refer to a communications protocol allowing for movement of data from the Internet on one side of the Internet-facing gateway 102 to another network, such as a network utilized by the service-providing entity 106. Communications provided through the tunnel may utilize some or all of the configuration information for the service-providing entity 106.

Examples described herein may accordingly reduce and/or eliminate upgrade dependencies between orchestrators and service-providing entities. For example, without use of the configuration APIs described herein, all configuration information (e.g., including run-time configuration information) may be stored at an orchestrator, such as orchestrator 104 of FIG. 1. However, doing so may require that the orchestrator also be upgraded when the service-providing entity is upgraded, which may be computationally expensive, time consuming, or otherwise undesirable. In examples described herein, an existing orchestrator (e.g., orchestrator 104) may obtain upgraded run-time configuration information from an exposed configuration API (e.g., configuration API 108). The orchestrator 104 need not itself be upgraded when the service-providing entity 106 is upgraded, in order to obtain upgraded run-time configuration information. Accordingly, upgraded run-time configuration information may be obtained by orchestrators described herein without upgrading the orchestrator.

Figure 2:
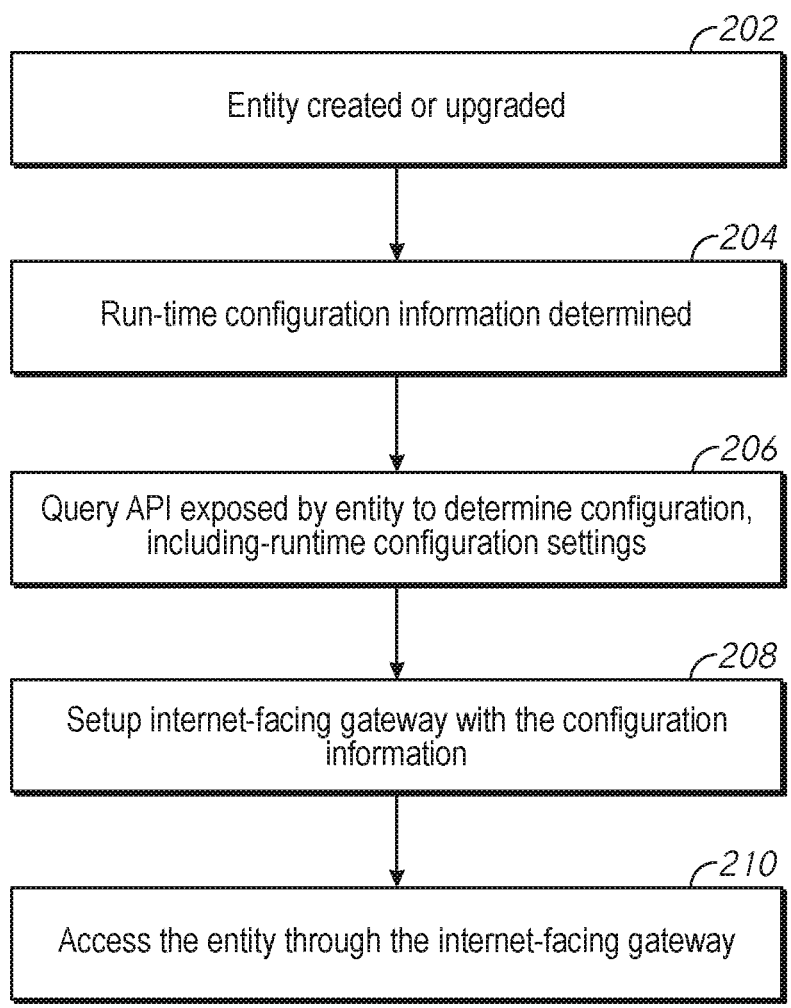
FIG. 2 is a flowchart of a method arranged in accordance with examples described herein.

FIG. 2 is a flowchart of a method arranged in accordance with examples described herein. The method of FIG. 2 includes block 202 "entity created or upgraded", which may be followed by block 204, "run-time configuration information determined." Block 204 may be followed by block 206 "query API exposed by entity to determine configuration, including run-time configuration", block 206 may be followed by block 208 "setup Internet-facing gateway with the configuration information", block 208 may be followed by block 210 "access the entity through the Internet-facing gateway," Additional, fewer, and/or different blocks may be used in other examples, and/or the blocks may be provided in a different order.

Examples of methods may include creating and/or upgrading an entity, such as in block 202 of FIG. 2. Generally, the entity may be created and/or updated responsive to a request of an orchestrator. For example, the orchestrator 104 of FIG. 1 may create and/or upgrade the service-providing entity 106. Creating an entity may include, for example, spinning up and/or provisioning one or more clusters and/or virtual machines. Upgrading an entity may include upgrading a software version associated with one or more entities.

During creation and/or upgrade of an entity, run-time configuration information may be determined, as in block 204 of FIG. 2. For example, the service-providing entity 106 may determine run-time configuration information when it is created and/or upgraded. Other configuration information (e.g., configuration information known to the orchestrator) may be known to the orchestrator creating and/or upgrading the entity before the entity is created and/or upgraded. Accordingly, one set of configuration information may be known to the orchestrator, such as orchestrator 104 of FIG. 1, while another set of configuration information (e.g., run-time configuration information) may be known to the service-providing entity 106, but not the orchestrator 104.

Run-time configuration information may be provided in examples described herein by querying an API exposed by the service-providing entity, such as in block 206. For example, the orchestrator 104 of FIG. 1 may query configuration API 108 exposed by the service-providing entity 106 to obtain run-time configuration information. In this manner, the orchestrator 104 may determine a complete set of configuration information, including configuration information known to the orchestrator 104 before creating and/or upgrading the service-providing entity 106 and run-time configuration information.

Examples of methods described herein may include providing configuration information to an Internet-facing gateway. For example, in block 208 of FIG. 2, an orchestrator, such as orchestrator 104 may setup an Internet-facing gateway, such as Internet-facing gateway 102, with the configuration information. Setting up the Internet-facing gateway may include storing the configuration information in a location accessible to the Internet-facing gateway. Setting up the Internet-facing gateway may include establishing a tunnel between the service providing entity, such as service-providing entity 106 of FIG. 1, and the Internet-facing gateway, such as the Internet-facing gateway 102 of FIG. 1, where communications through the tunnel may utilize some or all of the configuration information. Data may then be provided between the service-providing entity and the Internet-facing gateway through the tunnel.

Examples of methods may include accessing the service providing entity through the Internet-facing gateway, such as in block 210 of FIG. 2. For example, a user having access to the Internet connected to the Internet-facing gateway may access the service-providing entity through the tunnel and/or otherwise using the configuration information.

Examples of methods may repeat one or more of the blocks shown in FIG. 2. For example, after having created the entity and performed the blocks shown in FIG. 2, an orchestrator may upgrade the entity, performing block 202 again. Updated configuration information may be generated by the entity during the upgrade. An orchestrator may perform block 206 to query the entity and obtain the updated run-time continuation information, and may setup and/or update the Internet-facing gateway in block 208 with the updated run-time configuration information.

In some examples, an orchestrator may receive notification of elimination of a service-providing entity. For example, a service-providing entity may have failed, moved, and/or shut down. As another example, a tenant may be eliminated from a data center. The orchestrator may accordingly receive a notification of elimination of the tenant, and may identify eliminated service-providing entities associated with the eliminated tenant. Responsive to the notification that the service-providing entity had been eliminated, such as the service-providing entity 106 of FIG. 1, an orchestrator, such as the orchestrator 104 or FIG. 1 may remove one or more tunnels associated with the eliminated service-providing entity. For example, the orchestrator 104 may remove the tunnel between Internet-facing gateway 102 and service-providing entity 106 and/or may remove the configuration information (e.g., the run-time configuration information) associated with service-providing entity 106 from access by the Internet-facing gateway 102. In this manner, when entities are eliminated in systems described herein, access to the entities through Internet-facing gateways may also be eliminated. This may improve security in some examples. For example, if a tunnel remained open to an eliminated entity, it may be possible for a user or other process to utilize stored access credentials in an adverse manner, such as by impersonating the entity, making unauthorized calls, and/or creating other entities. Accordingly, it may be beneficial to ensure that tunnels and/or access through the Internet-facing gateway is closed once the service-providing entity is eliminated.

Figure 3:
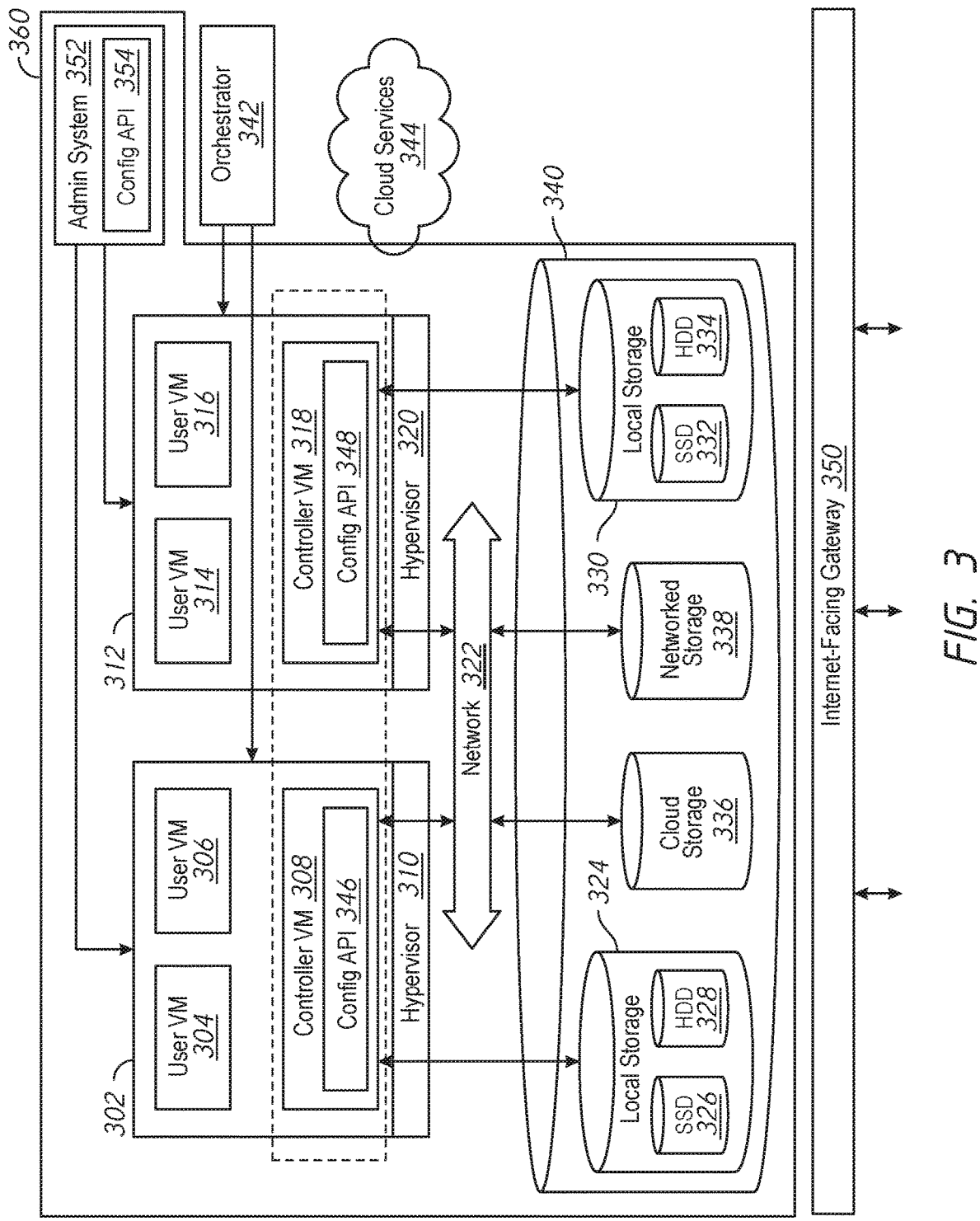
FIG. 3 is a schematic illustration of a distributed computing system, arranged in accordance with embodiments described herein.

FIG. 3 is a schematic illustration of a distributed computing system, arranged in accordance with embodiments described herein. The distributed computing system of FIG. 3 includes virtualized system 360, orchestrator 342, and Internet-facing gateway 350. The system of FIG. 3 may be used to provide one or more cloud services 344. The system of FIG. 1 may be used to implement components of FIG. 3. For example, the Internet-facing gateway 102 of FIG. 1 may be used to implement the Internet-facing gateway 350 of FIG. 3. The orchestrator 104 of FIG. 1 may be used to implement the orchestrator 342 of FIG. 3. The service-providing entity 106 of FIG. 1 may be used to implement certain one or more of the components of the virtualized system 360 of FIG. 3.

The virtualized system 360 may be a virtualized system for a particular tenant of a datacenter, for example, and may include admin system 352 which may be used to administer various virtual machines and actions of the virtualized system 360. The orchestrator 342 may be used to administer multiple virtualized systems, including virtualized system 360, for multiple tenants of the datacenter. In order to provide cloud services 344, one or more of the service-providing entities of the virtualized system 360 may desirably be accessible over an Internet. Accordingly, Internet-facing gateway 350 may be provided to allow for access to one or more service providing entities of the virtualized system 360. Components of the virtualized system 360 for which communication through the Internet-facing gateway 350 is desired may be provided with a configuration API for use in providing run-time configuration information to the Internet-facing gateway 350 as described herein analogously with reference to FIG. 1 and FIG. 2.

For example, the admin system 352 may be provided with config API 354. The orchestrator 342 may administer the admin system 352, and may receive run-time configuration information from the admin system 352. The orchestrator 342 may provide the run-time configuration information to the Internet-facing gateway 350 to facilitate communication with the admin system 352 over the Internet.

The virtualized system 360 of FIG. 3 generally includes computing node 302 and computing node 312 and storage 340 connected to a network 322. The network 322 may be any type of network capable of routing data transmissions from one network device (e.g., computing node 302, computing node 312, and storage 340) to another. For example, the network 322 may be a local area network (LAN), wide area network (WAN), intranet, Internet, or a combination thereof. In some examples, the network 322 is different than the Internet connected to the Internet-facing gateway 350. For example, the Internet-facing gateway 350 may be used to mediate communication between an Internet different than the network 322 and the network 322. The network 322 may be a wired network, a wireless network, or a combination thereof.

The storage 340 may include local storage 324, local storage 330, cloud storage 336, and networked storage 338. The local storage 324 may include, for example, one or more solid state chives (SSD 326) and one or more hard disk drives (HDD 328). Similarly, local storage 330 may include SSD 332 and HDD 334. Local storage 324 and local storage 330 may be directly coupled to, included in, and/or accessible by a respective computing node 302 and/or computing node 312 without communicating via the network 322. Other nodes, however, may access the local storage 324 and/or the local storage 330 using the network 322. Cloud storage 336 may include one or more storage servers that may he stored remotely to the computing node 302 and/or computing node 312 and accessed via the network 322. The cloud storage 336 may generally include any type of storage device, such as HDDs SSDs, or optical drives. Networked storage 338 may include one or more storage devices coupled to and accessed via the network 322. The networked storage 338 may generally include any type of storage device, such as HDDs SSDs, and/or NVM Express (NVMe). In various embodiments, the networked storage 338 may be a storage area network (SAN). The computing node 302 is a computing device for hosting virtual machines (VMs) in the distributed computing system of FIG. 1. The computing node 302 may be, for example, a server computer. The computing node 302 may include one or more physical computing components, such as processors.

The computing node 302 is configured to execute a hypervisor 310, a controller VM 308 and one or more user VMs, such as user VM 304, user VM 306. The user VMs including user VM 304 and user VM 306 are virtual machine instances executing on the computing node 302. The user VMs including user VM 304 and user VM 306 may share a virtualized pool of physical computing resources such as physical processors and storage (e.g., storage 340). The user VMs including user VM 304 and user VM 306 may each have their own operating system, such as Windows or Linux. While a certain number of user VMs are shown, generally any number may be implemented. User VMs may generally be provided to execute any number of applications which may be desired by a user. In some examples, one or more of the user VMs may be provided with configuration APIs as described herein for use in providing run-time configuration information and making the user VMs accessible through the Internet-facing gateway 350.

The hypervisor 310 may he any type of hypervisor. For example, the hypervisor 310 may be ESX, ESX(i), Hyper-V, KVM, or any other type of hypervisor. The hypervisor 310 manages the allocation of physical resources (such as storage 340 and physical processors) to VMs (e.g., user VM 304, user VM 306, and controller VM 308) and performs various VM related operations, such as creating new VMs and cloning existing VMs. Controller VMs (CVMs) described herein, such as the controller VM 308 and/or controller VM 318, may provide services for the user VMs in the computing node. As an example of functionality that a controller VM may provide, the controller VM 308 may provide virtualization of the storage 340. Controller VMs may provide management of the distributed computing system shown in FIG. 3. Examples of controller VMs may execute a variety of software and/or may serve the I/O operations for the hypervisor and VMs running on that node. In some examples, a SCSI controller, which may manage SSD and/or HDD devices described herein, may be directly passed to the CVM, e.g., leveraging PCI Passthrough in some examples. In this manner, controller VMs described herein may manage input/output (I/O) requests between VMs on a computing node and available storage, such as storage 340.

The computing node 312 may include user VM 314, user VM 316, a controller VM 318, and a hypervisor 320. The user VM 314, user VM 316, the controller VM 318, and the hypervisor 320 may be implemented similarly to analogous components described above with respect to the computing node 302. For example, the user VM 314 and user VM 316 may be implemented as described above with respect to the user VM 304 and user VM 306. The controller VM 318 may be implemented as described above with respect to controller VM 308. The hypervisor 320 may be implemented as described above with respect to the hypervisor 310. In the embodiment of FIG. 3, the hypervisor 320 may be a different type of hypervisor than the hypervisor 310. For example, the hypervisor 320 may be Hyper-V, while the hypervisor 310 may be ESX(i). In some examples, the hypervisor 310 may be of a same type as the hypervisor 320.

The controller VM 308 and controller VM 318 may communicate with one another via the network 322. By linking the controller VM 308 and controller VM 318 together via the network 322, a distributed network of computing nodes including computing node 302 and computing node 312 (e.g., a cluster), can be created.

Controller VMs, such as controller VM 308 and controller VM 318, may each execute a variety of services and may coordinate, for example, through communication over network 322. Services running on controller VMs may utilize an amount of local memory to support their operations. Moreover, multiple instances of the same service may be running throughout the distributed system—e.g. a same services stack may be operating on each controller VM. For example, an instance of a service may be running on controller VM 308 and a second instance of the service may be running on controller VM 318.

Generally, controller VMs described herein, such as controller VM 308 and controller VM 318 may be employed to control and manage any type of storage device, including all those shown in storage 340 of FIG. 3, including local storage 324 (e.g., SSD 326 and HDD 328), cloud storage 336, and networked storage 338. Controller VMs described herein may implement storage controller logic and may virtualize all storage hardware as one global resource pool (e.g., storage 340) that may provide reliability, availability, and performance. IP-based requests are generally used (e.g., by user VMs described herein) to send. I/O requests to the controller VMs. For example, user VM 304 and user VM 306 may send storage requests to controller VM 308 using over a virtual bus. Controller VMs described herein, such as controller VM 308, may directly implement storage and I/O optimizations within the direct data access path. Communication between hypervisors and controller VMs described herein may occur using IP requests.

Note that controller VMs are provided as virtual machines utilizing hypervisors described herein—for example, the controller VM 308 is provided behind hypervisor 310. Since the controller VMs run "above" the hypervisors examples described herein may be implemented within any virtual machine architecture, since the controller VMs may be used in conjunction with generally any hypervisor from any virtualization vendor.

Controller VMs may be provided with configuration APIs as described herein. For example, the controller VM 308 may be provided with config API 346 and the controller VM 318 may be provided with config API 348. The configuration APIs may facilitate the ability for run-time configuration for the controller VMs to be provided to the Internet-facing gateway 350 by the orchestrator 342, thereby making the controller VMs accessible over the Internet.

Virtual disks (vDisks) may be structured from the storage devices in storage 340, as described herein. A vDisk generally refers to the storage abstraction that may be exposed by a controller VM to be used by a user VM. In some examples, the vDisk may be exposed via iSCSI ("internet small computer system interface") or NFS ("network file system") and may be mounted as a virtual disk on the user VM. For example, the controller VM 308 may expose one or more vDisks of the storage 340 and the hypervisor may attach the vDisks to one or more VMs, and the virtualized operating system may mount a vDisk on one or more user VMs, such as user VM 304 and/or user VM 306.

During operation, user VMs (e.g., user VM 304 and/or user VM 306) may provide storage input/output (I/O) requests to controller VMs (e.g., controller VM 308 and/or hypervisor 310). Accordingly, a user VM may provide an request over a virtual bus to a hypervisor as an iSCSI and/or NFS request. Internet Small Computer System Interface (iSCSI) generally refers to an IP-based storage networking standard for linking data storage facilities together. By carrying SCSI commands over IP networks, iSCSI can be used to facilitate data transfers over intranets and to manage storage over any suitable type of network or the Internet. The iSCSI protocol allows iSCSI initiators to send SCSI commands to iSCSI targets at remote locations over a network. In some examples, user VMs may send I/O requests to controller VMs in the form of NFS requests. Network File System (NFS) refers to an IP-based file access standard in which NFS clients send file-based requests to NFS servers via a proxy folder (directory) called "mount point". Generally, then, examples of systems described herein may utilize an IP-based protocol (e.g., iSCSI and/or NFS) to communicate between hypervisors and controller VMs.

During operation, examples of user VMs described herein may provide storage requests. The storage requests may designate the IP address for a controller VM from which the user VM desires I/O services. The storage request may be provided from the user VM to a virtual switch within a hypervisor to be routed to the correct destination. For examples, the user VM 304 may provide a storage request to hypervisor 310. The storage request may request I/O services from controller VM 308 and/or controller VM 318. If the request is to be intended to be handled by a controller VM in a same service node as the user VM (e.g., controller VM 308 in the same computing node as user VM 304) then the storage request may be internally routed within computing node 302 to the controller VM 308. In some examples, the storage request may be directed to a controller VM on another computing node. Accordingly, the hypervisor (e.g., hypervisor 310) may provide the storage request to a physical switch to be sent over a network (e.g., network 322) to another computing node running the requested controller VM (e.g., computing node 312 running controller VM 318).

Generally, VMs described herein may be presented with a virtual block device, to which the VM may send block commands, such as read and write. The hypervisor backs this virtual device and in turn forwards the IO commands to a controller VM, using a protocol such as NTS or iSCSI. The interface between user VMs and the hypervisor can be a virtualized hard disk controller, such as SATA, or a virtualization-aware I/O bus using, for example, a ring buffer such as vitro.

Accordingly, hypervisors described herein may manage I/O requests between user VMs in a system and a storage pool. Controller VMs may virtualize I/O access to hardware resources within a storage pool according to examples described herein. In this manner, a separate and dedicated controller (e.g., controller VM) may be provided for each and every computing node within a virtualized computing system (e.g., a cluster of computing nodes that run hypervisor virtualization software), since each computing node may include its own controller VM. Each new computing node in the system may include a controller VM to share in the overall workload of the system to handle storage tasks. Therefore, examples described herein may be advantageously scalable, and may provide advantages over approaches that have a limited number of controllers. Consequently, examples described herein may provide a massively-parallel storage architecture that scales as and when hypervisor computing nodes are added to the system.

Systems and methods utilizing configuration APIs described herein may advantageously aid in allowing virtualized systems such as virtualized system 360 of FIG. 3 to provide cloud services 344, e.g., services accessible over the Internet. In a data center environment (e.g., a cloud service provider site), the orchestrator 342 may need to dynamically create, modify, upgrade, and/or delete various virtualized systems or components of virtualized systems for multiple tenants. Accordingly, a variety of run-time configuration information will be generated as components are created, modified, upgraded, and/or deleted. Without the use of configuration APIs described herein, it may be cumbersome or infeasible to provide sufficient configuration information about components of the virtualized system 360 to the Internet-facing gateway 350 to allow for Internet communication with the components. Upgrade dependencies may be created between, for example components of the virtualized system 360 and the orchestrator 342 if only one component (e.g., the orchestrator) is used to store all the configuration information. By allowing the orchestrator 342 to query the configuration API for the run-time configuration information, upgrade dependencies may be reduced or eliminated, and cloud services may be provided in an improved, and more trusted manner.

Figure 4:
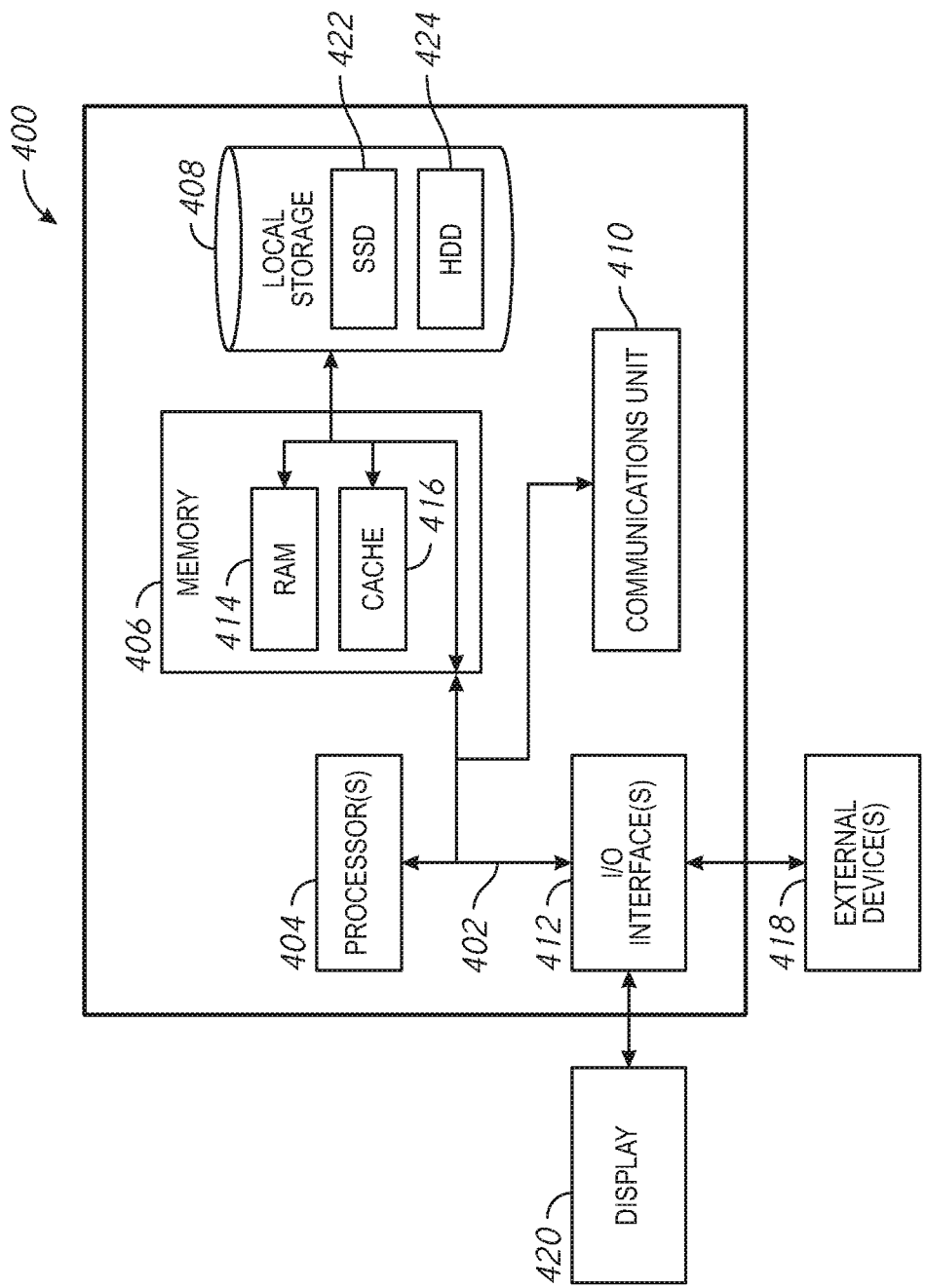
FIG. 4 is a block diagram of components of a computing node in accordance with examples described herein.

FIG. 4 depicts a block diagram of components of a computing node 400 in accordance with an embodiment of the present invention. It should be appreciated that FIG. 4 provides only an illustration of one implementation and does not imply any limitations with regard to the environments in which different embodiments may be implemented. Many modifications to the depicted environment may be made. The computing node 400 may implemented as the computing node 302 and/or computing node 312 of FIG. 3.

The computing node 400 includes one or more communications fabric(s) 402, which provides communications between one or more processor(s) 404, memory 406, local storage 408, communications unit 410, 110 interface(s) 412. The communications fabric(s) 402 can be implemented with any architecture designed for passing data and/or control information between processors (such as microprocessors, communications and network processors, etc.), system memory, peripheral devices, and any other hardware components within a system. For example, the communications fabric(s) 402 can be implemented with one or more buses.

The memory 406 and the local storage 408 are computer-readable storage media. In this embodiment, the memory 406 includes random access memory RAM 414 and cache 416. In general, the memory 406 can include any suitable volatile or non-volatile computer-readable storage media. The local storage 408 may be implemented as described above with respect to local storage 124 and/or local storage 130. In this embodiment, the local storage 408 includes an SSD 422 and an HDD 424, which may be implemented as described above with respect to SSD 326, SSD 332 and HDD 328, HDD 334 respectively.

Various computer instructions, programs, tiles, images, etc. may be stored in local storage 408 for execution by one or more of the respective processor(s) 404 via one or more memories of memory 406. In some examples, local storage 408 includes a magnetic HDD 424. Alternatively, or in addition to a magnetic hard disk drive, local storage 408 can include the SSD 422, a semiconductor storage device, a read-only memory (ROM), an erasable programmable read-only memory (EPROM), a flash memory, or any other computer-readable storage media that is capable of storing program instructions or digital information.

The media used by local storage 408 may also be removable. For example, a removable hard drive may be used for local storage 408. Other examples include optical and magnetic disks, thumb drives, and smart cards that are inserted into a drive for transfer onto another computer-readable storage medium that is also part of local storage 408.

Communications unit 410, in these examples, provides for communications with other data processing systems or devices. In these examples, communications unit 410 includes one or more network interface cards. Communications unit 410 may provide communications through the use of either or both physical and wireless communications links.

I/O interface(s) 412 allows for input and output of data with other devices that may be connected to computing node 400. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention can be stored on such portable computer-readable storage media and can be loaded onto local storage 408 via I/O interface(s) 412. I/O interface(s) 412 also connect to a display 420.

Display 420 provides a mechanism to display data to a user and may be, for example, a computer monitor.

From the foregoing it will be appreciated that, although specific embodiments have been described herein for purposes of illustration, various modifications may be made while remaining with the scope of the claimed technology.

Examples described herein may refer to various components as "coupled" or commands or other communications as being "provided to" or "received from" certain components. It is to be understood that in some examples the components are directly coupled one to another, while in other examples the components may be coupled with intervening components disposed between them. Similarly, commands or other communications may be provided directly to and/or received directly from the recited components without intervening components, but also may be provided to and/or received from the certain components through intervening components.

What is claimed is:

1. A system comprising:
a service-providing entity hosted by a computing system, wherein the service-providing entity exposes a configuration application programming interface (API), and wherein the service-providing entity is configured to provide run-time configuration information generated at a time the service-providing entity is setup, upgraded, or combinations thereof; and
an orchestrator system configured to administer the service-providing entity, the orchestrator system configured to query the configuration API to obtain the run-time configuration information and to provide a first set of configuration information for the service-providing entity and the run-time configuration information to an Internet-facing gateway to allow connections to the service-providing entity through the Internet-facing gateway.

2. The system of claim 1, wherein the orchestrator system is within a trusted network, the service-providing entity is outside the trusted network, and wherein the Internet-facing gateway is configured to communicate with the trusted network.

3. The system of claim 1, wherein the orchestrator system is configured to administer multiple service providing entities.

4. The system of claim 1, wherein the service-providing entity is associated with a single tenant of a data center.

5. The system of claim 1, wherein the run-time configuration information comprises one or both of a domain name and an IP address.

6. The system of claim 1, wherein the first set of configuration information comprises an amount of allocated storage, software versions associated with the service-providing entity, or combinations thereof.

7. The system of claim 1, wherein the service-providing entity comprises a controller virtual machine, the controller virtual machine in a cluster with other controller virtual machines hosted by other nodes of the cluster, the controller virtual machine mediating requests to a storage pool shared among the cluster.

8. A method comprising:
determining, at an orchestrator, a first set of configuration information for a service-providing entity created by the orchestrator;
querying, by the orchestrator, a configuration application programming interface (API) exposed by the service-providing entity, to obtain run-time configuration information for the service-providing entity;
providing, by the orchestrator, the first set of configuration information and the run-time configuration information to an Internet-facing gateway; and
establishing, based on the first set of configuration information and the run-time configuration information, a tunnel between the service-providing entity and the Internet-facing gateway for communication of data between the service-providing entity and the Internet-facing gateway.

9. The method of claim 8, further comprising, allowing user access to the service-providing entity through the Internet-facing gateway.

10. The method of claim 8, further comprising upgrading, responsive to a command from the orchestrator, the service-providing entity, including, at the service-providing entity, generating updated run-time configuration information; and
querying, by the orchestrator, the configuration API to obtain the updated run-time configuration information.

11. The method of claim 8, further comprising:
removing, at a request of the orchestrator, the tunnel responsive to a received notification of elimination of the service-providing entity, the notification received at the orchestrator.

12. The method of claim 11, wherein said receiving notification of elimination of the service-providing entity comprises receiving notification of elimination of a tenant of a data center, the tenant associated with the service-providing entity.

13. The method of claim 11, wherein said removing comprises removing the run-time configuration information from the Internet-facing gateway.

14. The method of claim 8, wherein the service-providing entity comprises a controller virtual machine, the controller virtual machine forming a cluster with other controller virtual machines hosted by other nodes of the cluster, the controller virtual machine mediating requests to a storage pool shared among the cluster.

15. A node of a cluster in a data center, the node comprising:
at least one processor;
memory encoded with executable instructions which, when executed by the at least one processor cause the node to provide a service including a configuration application programming interface (API), wherein:
the configuration API is configured to provide run-time configuration information responsive to a query from an orchestrator of the data center; and
the service is configured to communicate data to an Internet-facing gateway specified by the orchestrator through a tunnel established by the orchestrator using the run-time configuration information and additional configuration information determined by the orchestrator.

16. The node of claim 15, wherein the orchestrator is a multi-tenant orchestrator configured communicate with multiple services in the data center.

17. The node of claim 15, wherein the node is a tenant-specific node, associated with a single tenant of the data center.

18. The node of claim 15, wherein the configuration API is configured to provide a json template including the run-time configuration information.

19. The node of claim 18, wherein the orchestrator is configured to call the Internet-facing gateway with an extended payload including the run-time configuration information.

20. The node of claim 18, wherein the run-time configuration information includes information used in providing a DNS mapping for the service.

21. At least one non-transitory computer readable media encoded with instructions for implementing an orchestrator, the instructions comprising instructions for:
- determining a first set of configuration information for a service-providing entity created by the orchestrator;
- requesting run-time configuration information from an application programming interface (API) exposed by the service-providing entity;
- providing the first set of configuration information and the run-time configuration information to an Internet-facing gateway; and
- establishing, based on the first set of configuration information and the run-time configuration information, a tunnel between the service-providing entity and the Internet-facing gateway for communication of data between the service-providing entity and the Internet-facing gateway.

22. The at least one non-transitory computer readable media of claim 21, further encoded with instructions for allowing user access to the service-providing entity through the Internet-facing gateway.

23. The at least one non-transitory computer readable media of claim 21, wherein the run-time configuration information comprises one or both of a domain name and an IP address.

24. The system of claim 1, wherein the run-time configuration information is generated at creation or update of the service-providing entity.

25. The system of claim 1, wherein the first set of configuration information is obtained by the orchestration system independent from the service-providing entity.

26. The method of claim 8, wherein the orchestrator is hosted by the computing system.

27. The method of claim 8, wherein the run-time configuration information is generated at creation or update of the service-providing entity.

28. The node of claim 15, wherein the run-time information is generated at creation or update of the service.

29. The at least one non-transitory computer readable media of claim 21, wherein the run-time configuration information is generated at creation or update of the service-providing entity.

* * * * *

UNITED STATES PATENT AND TRADEMARK OFFICE
CERTIFICATE OF CORRECTION

PATENT NO. : 11,588,712 B2
APPLICATION NO. : 16/206237
DATED : February 21, 2023
INVENTOR(S) : Aman Nijhawan et al.

It is certified that error appears in the above-identified patent and that said Letters Patent is hereby corrected as shown below:

In the Claims

Claim 16, Column 14, Line 63, change "configured communicate" to --configured to communicate--.

Signed and Sealed this
Fourteenth Day of May, 2024

Katherine Kelly Vidal
*Director of the United States Patent and Trademark Office*